(12) United States Patent
Zhou et al.

(10) Patent No.: US 12,400,382 B2
(45) Date of Patent: Aug. 26, 2025

(54) IMAGE PROCESSING METHOD AND IMAGE PROCESSING APPARATUS

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Fangru Zhou, Beijing (CN); Mei Yang, Beijing (CN); Shan An, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 204 days.

(21) Appl. No.: 18/264,739

(22) PCT Filed: Jan. 4, 2022

(86) PCT No.: PCT/CN2022/070038
§ 371 (c)(1),
(2) Date: Aug. 8, 2023

(87) PCT Pub. No.: WO2022/170890
PCT Pub. Date: Aug. 18, 2022

(65) Prior Publication Data
US 2024/0127507 A1 Apr. 18, 2024

(30) Foreign Application Priority Data
Feb. 9, 2021 (CN) .......................... 202110178127.2

(51) Int. Cl.
*G06T 11/60* (2006.01)
*G06T 7/11* (2017.01)
(Continued)

(52) U.S. Cl.
CPC ................ *G06T 11/60* (2013.01); *G06T 7/11* (2017.01); *G06T 15/00* (2013.01); *G06V 10/25* (2022.01);
(Continued)

(58) Field of Classification Search
CPC . G06T 11/60; G06T 7/11; G06T 15/00; G06T 2207/10024; G06V 10/25; G06V 10/56; G06V 10/60
See application file for complete search history.

(56) References Cited

U.S. PATENT DOCUMENTS

2010/0177109 A1* 7/2010 Moore ................... H04N 1/622
345/589
2015/0363952 A1* 12/2015 Sun ........................... G06T 5/50
382/284

FOREIGN PATENT DOCUMENTS

CN 102881011 A 1/2013
CN 106251286 A 12/2016
(Continued)

OTHER PUBLICATIONS

"International Search Report and English language translation", International Application No. PCT/CN2022/070038, Mar. 31, 2022, 6 pp.
(Continued)

*Primary Examiner* — Xin Sheng
(74) *Attorney, Agent, or Firm* — Myers Bigel, P.A.

(57) ABSTRACT

The present disclosure provides an image processing method and an image processing apparatus. The image processing method including replacing an object in a scene image with a preset template image to generate a virtual image; dividing the scene image into a plurality of image blocks with a preset size; determining pixel residuals of the scene image according to an average pixel value of pixel points in an area where the object is located in the scene image and an average pixel
(Continued)

value of pixel points falling into the area where the object is located in each of the plurality of image blocks; determining illumination offsets according to the pixel residuals; and updating pixel values of pixel points in the virtual image according to the illumination offsets to implement illumination transfer.

19 Claims, 5 Drawing Sheets

(51) Int. Cl.
　　　*G06T 15/00*　　　(2011.01)
　　　*G06V 10/25*　　　(2022.01)
　　　*G06V 10/56*　　　(2022.01)
　　　*G06V 10/60*　　　(2022.01)
(52) U.S. Cl.
　　　CPC .............. *G06V 10/56* (2022.01); *G06V 10/60* (2022.01); *G06T 2207/10024* (2013.01)

(56) References Cited

FOREIGN PATENT DOCUMENTS

| CN | 106780707 | A |   | 5/2017 |
| CN | 106851090 | A | * | 6/2017 |
| CN | 107205142 | A |   | 9/2017 |
| CN | 110473176 | A |   | 11/2019 |
| CN | 111760277 | A |   | 10/2020 |
| CN | 113744364 | A |   | 12/2021 |

OTHER PUBLICATIONS

"First Office Action and English language translation", CN Application No. 202110178127.2, Jul. 13, 2023, 12 pp.
"Written Opinion and English language translation", International Application No. PCT/CN2022/070038, Mar. 31, 2022, 10 pp.

* cited by examiner

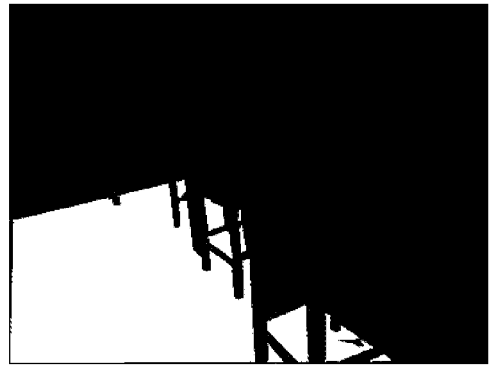
Fig. 5A                    Fig. 5B
Fig. 6
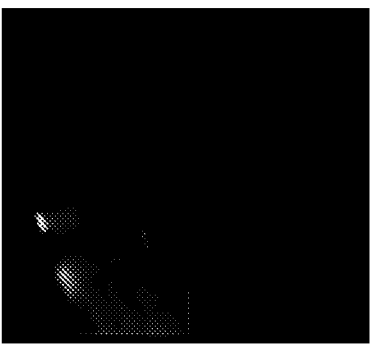
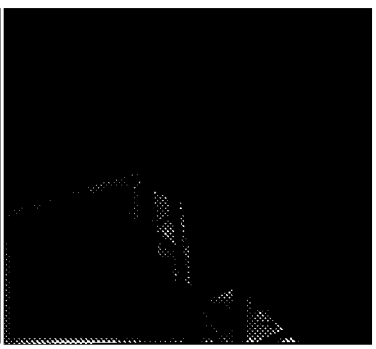
Fig. 7A            Fig. 7B            Fig. 7C

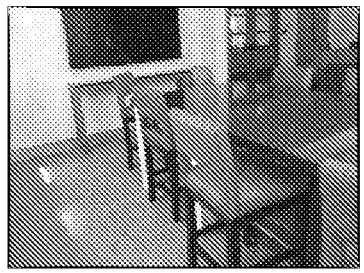 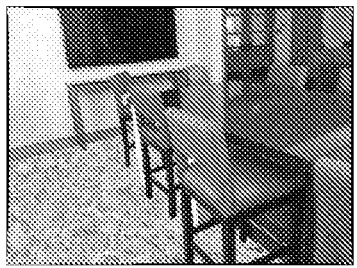 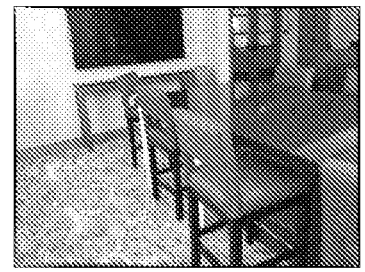
Fig. 8A            Fig. 8B            Fig. 8C
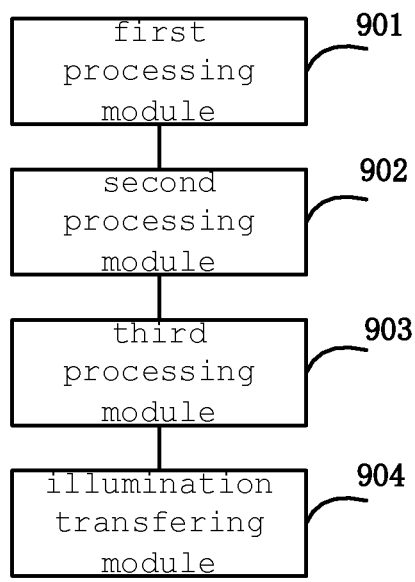
Fig. 9

IMAGE PROCESSING METHOD AND IMAGE PROCESSING APPARATUS

CROSS-REFERENCE TO RELATED APPLICATIONS

The present application is a U.S. National Stage application under 35 U.S.C. § 371 of International Patent Application No. PCT/CN2022/070038, filed on Jan. 4, 2022, which itself is based on and claims priority from CN application No. 202110178127.2, filed on Feb. 9, 2021, the disclosures of both of which are hereby incorporated herein by reference in its entirety their entireties into the present application.

TECHNICAL FIELD

The present disclosure relates to the field of information processing, and in particular, to an image processing methods and an image processing apparatuses.

BACKGROUND

At present, image presentation is widely applied as means of propaganda, the propaganda effect can be effectively improved by showing objects such as floors, carpets and the like in different decoration scenes. For example, by generating a virtual image by replacing the original floor in an scene image with a template image selected by a user and rendering a new object in the virtual image with a virtual light source, the virtual image seems to have been captured in a real scene.

SUMMARY

According to a first aspect of an embodiment of the present disclosure, there is provided an image processing method comprising: replacing an object in a scene image with a preset template image to generate a virtual image; dividing the scene image into a plurality of image blocks with a preset size; determining pixel residuals of the scene image according to an average pixel value of pixel points in an area where the object is located in the scene image and an average pixel value of pixel points falling into the area where the object is located in each of the plurality of image blocks; determining illumination offsets according to the pixel residuals; and updating pixel values of pixel points in the virtual image according to the illumination offsets to implement illumination transfer.

In some embodiments, the replacing the object in the scene image with the preset template image comprises: mapping the template image into a pixel coordinate system of the scene image to generate a transformed image; and replacing the object in the scene image with the transformed image to generate the virtual image.

In some embodiments, the mapping the template image into the pixel coordinate system of the scene image comprises: generating a minimum bounding rectangle of the object in the scene image; mapping the minimum bounding rectangle from the pixel coordinate system to a preset plane coordinate system to obtain a first image; transforming the first image into a square to obtain a second image; determining a first transformation submatrix for mapping the template image to the second image; determining a second transformation submatrix for mapping the first image to the minimum bounding rectangle; obtaining a transformation matrix according to the first transformation submatrix and the second transformation submatrix; and mapping the template image into the pixel coordinate system according to the transformation matrix.

In some embodiments, the transformation matrix is a product of the second transformation submatrix and the first transformation submatrix.

In some embodiments, the determining the pixel residuals of the scene image comprises: taking the average pixel value of the pixel points in the area where the object is located in the scene image as a reference average value; taking the average pixel value of the pixel points falling into the area of the object in each of the plurality of image blocks as an average pixel value of the each of the plurality of image blocks; and determining the pixel residuals of the scene image according to the average pixel value of the each of the plurality of image blocks and the reference average value.

In some embodiments, the determining the illumination offsets according to the pixel residuals comprises: performing interpolation processing on the pixel residuals to obtain the illumination offsets, wherein a size of a visual image corresponding to the illumination offsets is the same as a size of the virtual image.

In some embodiments, the updating the pixel values of the pixel points in the virtual image according to the illumination offsets comprises: calculating a first product of an offset $D_{i,j}$ corresponding to a pixel point $P_{i,j}$ at an $i^{th}$ row, a $j^{th}$ column of the virtual image in the illumination offsets and an illumination transfer adjusting parameter $\sigma$; calculating a first sum of a pixel value $R_{i,j}^2$ of a red channel of the pixel point $P_{i,j}$ and the first product, calculating a second sum of a pixel value $G_{i,j}^2$ of a green channel of the pixel point $P_{i,j}$ and the first product, and calculating a third sum of a pixel value $B_{i,j}^2$ of a blue channel of the pixel point $P_{i,j}$ and the first product; and taking a maximum value of a second parameter and a minimum value of the first sum and a first parameter as a pixel value $R_{i,j}^3$ of a red channel of a pixel point at an $i^{th}$ row, a $j^{th}$ column in a first transformed image, taking a maximum value of the second parameter and a minimum value of the second sum and the first parameter as a pixel value $G_{i,j}^3$ of a green channel of the pixel point at the $i^{th}$ row, the $j^{th}$ column in the first transformed image, and taking a maximum value of the second parameter and a minimum value of the third sum and the first parameter as a pixel value $B_{i,j}^3$ of a blue channel of the pixel point at the $i^{th}$ row, the $j^{th}$ column in the first transformed image.

In some embodiments, the method further comprising: adjusting a saturation of a first transformed image according to the illumination offsets to generate a second transformed image after updating the pixel values of the pixel points in the virtual image according to the illumination offsets to generate the first transformed image; and transforming pixel values of a hue channel, a saturation channel and a value channel in the hue, saturation and value HSV color space of the second transformed image into a red, green and blue RGB color space.

In some embodiments, the adjusting the saturation of the first transformed image according to the illumination offsets comprises: performing normalization processing on the illumination offsets; calculating a second product of an offset $D_{i,j}''$ corresponding to a pixel point $P_{i,j}$ at an $i^{th}$ row, a $j^{th}$ column in the first transformed image in a normalized illumination offsets and a saturation adjusting parameter $\alpha$; calculating a difference between a third parameter and the second product; and taking a maximum value of a fourth parameter and a third product of a pixel value $S_{i,j}^3$ of the saturation channel of the pixel point $P_{i,j}$ in an $i^{th}$ row, a $j^{th}$ column in the first transformed image and the difference as a pixel value $S_{i,j}^{3'}$ of a saturation channel of a pixel point at an $i^{th}$ row, a $j^{th}$ column in the second transformed image.

According to a second aspect of an embodiment of the present disclosure, there is provided an image processing apparatus comprising: a first processing module configured to replace an object in a scene image with a preset template image to generate a virtual image; a second processing module configured to divide the scene image into a plurality of image blocks with a preset size, and determine pixel residuals of the scene image according to an average pixel value of pixel points in an area where the object is located in the scene image and an average pixel value of pixel points falling into the area where the object is located in each of the plurality of image blocks; a third processing module configured to determine illumination offsets according to the pixel residuals; and an illumination transferring module configured to update pixel values of pixel points in the virtual image according to the illumination offsets to implement illumination transfer.

According to a third aspect of the embodiments of the present disclosure, there is provided an image processing apparatus comprising: a memory; and a processor coupled to the memory, which is configured to execute the image processing method according to any of the embodiments described above on a basis of instructions stored in the memory.

According to a fourth aspect of the embodiments of the present disclosure, there is provided a non-transitory computer-readable storage medium that stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below, it is obvious that the drawings in the following description are only some of the embodiments of the present disclosure, and for those skilled in the art, other drawings may be obtained according to the drawings without inventive effort.

FIGS. 5A and 5B are schematic diagrams of a scene image and a mask image according to some embodiments of the present disclosure;

FIG. 6 is a schematic diagram of a virtual image according to one embodiment of the present disclosure;

FIGS. 7A-7C are schematic diagrams of a scene image and illumination offsets according to some embodiments of the present disclosure;

FIGS. 8A-8C are schematic diagrams of a scene image, a virtual image, and a transformed image according to some embodiments of the present disclosure;

FIG. 9 is a schematic structural diagram of an image processing apparatus according to one embodiment of the present disclosure;

DETAILED DESCRIPTION

Figure 1:
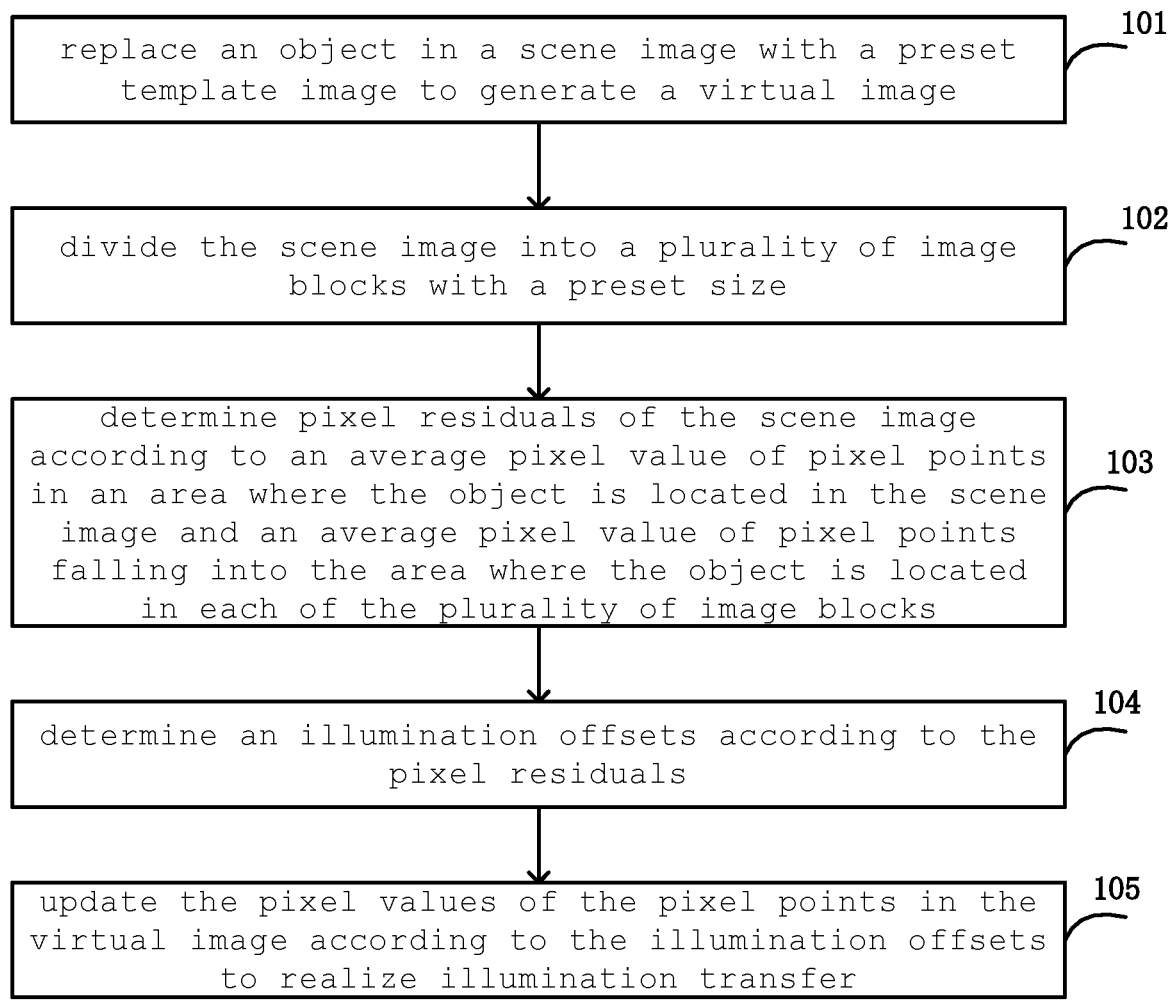
FIG. 1 is a schematic flowchart of an image processing method according to one embodiment of the present disclosure.

The technical solutions in the embodiments of the present disclosure will be described clearly and completely with reference to the drawings in the embodiments of the present disclosure, and it is obvious that the embodiments described are only some embodiments of the present disclosure, rather than all embodiments. The following description of at least one exemplary embodiment is merely illustrative in nature and is in no way intended to limit the present disclosure, its application, or uses. All other embodiments, which can be derived by a person skilled in the art from the embodiments disclosed herein without paying inventive effort, are within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in following figures.

The inventors find that, in the related art, the rendered image is not smooth enough, thereby reducing the image quality and degrading the user experience.

Accordingly, the present disclosure provides an image processing scheme capable of making a virtual image more natural through illumination transfer.

FIG. 1 is a schematic flowchart of an image processing method according to one embodiment of the present disclosure. In some embodiments, the following steps of the image processing method are performed by an image processing apparatus.

In step 101, an object in a scene image is replaced with a preset template image to generate a virtual image.

In some embodiments, the template image is mapped into a pixel coordinate system of the scene image to generate a transformed image. The object in the scene image is replaced with the transformed image to generate a virtual image.

Figure 2:
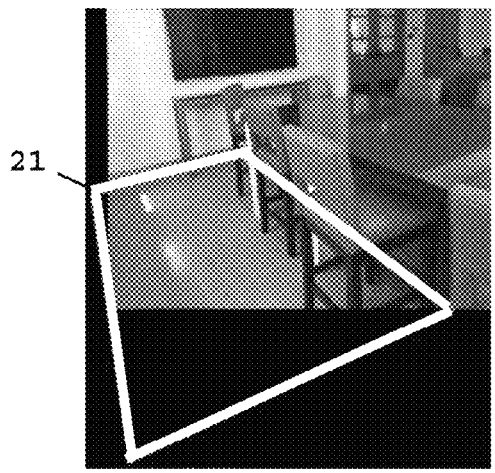
FIG. 2 is a schematic diagram of a scene image according to one embodiment of the present disclosure.

For example, as shown in FIG. 2, the object in the scene image is a floor.

First, a minimum bounding rectangle of the object is generated in the scene image $I^1$, as indicated by the white-line box 21 in FIG. 2. For example, by finding four vertices including the floor area in the scene image, a minimum bounding rectangle Reg of the target is formed according to the four vertices.

Figure 3:
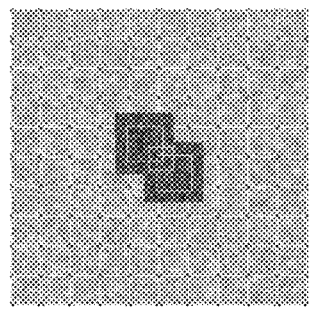
FIG. 3 is a schematic diagram of a template image according to one embodiment of the present disclosure.

Then, the minimum bounding rectangle Reg is mapped from the pixel coordinate system of the scene image $I^1$ into a preset planar coordinate system to obtain a first image Box. Since the template image $I^0$ is a square, as shown in FIG. 3, the first image Box is transformed into a square to obtain a second image Squ in order to avoid distortion in when mapping the template image $I^0$ to the scene image $I^1$.

Next, a first transformation submatrix $T_1$ for mapping the template image $I^0$ to the second image Squ is determined, and a second transformation submatrix $T_2$ for mapping the first image Box to the minimum bounding rectangle Reg is determined. A transformation matrix is obtained according to the first transformation submatrix and the second transformation submatrix.

In some embodiments, the transformation matrix is a product of the second transformation submatrix and the first transformation submatrix, i.e., the transformation matrix is $T_2T_1$.

At last, the template image $I^0$ is mapped into a pixel coordinate system according to a transformation matrix.

For example, the coordinates of the four vertices of the minimum bounding rectangle Reg are:

$$V_{Reg} = \{v_1^{reg}, v_2^{reg}, v_3^{reg}, v_4^{reg}\} \quad (1)$$

wherein $v_i^{reg} = (x_i^{reg}, y_i^{reg})$, i=1, 2, 3, 4.

The coordinates of the vertices of the first image Box in the planar coordinate system are:

$$V_{Box} = \{v_1^{box}, v_2^{box}, v_3^{box}, v_4^{box}\} \quad (2)$$

Let: 
$$w_b = \sqrt{\left(\frac{x_1^{reg}+x_4^{reg}}{2} - \frac{x_2^{reg}+x_3^{reg}}{2}\right)^2 + \left(\frac{y_1^{reg}+y_4^{reg}}{2} - \frac{y_2^{reg}+y_3^{reg}}{2}\right)^2} \quad (3)$$

$$h_b = \sqrt{\left(\frac{x_1^{reg}+x_2^{reg}}{2} - \frac{x_3^{reg}+x_4^{reg}}{2}\right)^2 + \left(\frac{y_1^{reg}+y_2^{reg}}{2} - \frac{y_3^{reg}+y_4^{reg}}{2}\right)^2} \quad (4)$$

$$a_s = \max(w_b, h_b) \quad (5)$$

Then, the above equation (2) can be expressed as:

$$V_{Box} = \left\{\left(\frac{a_s - w_b}{2}, \frac{a_s - h_b}{2}\right), \left(\frac{a_s + w_b}{2}, \frac{a_s - h_b}{2}\right), \left(\frac{a_s + w_b}{2}, \frac{a_s + h_b}{2}\right), \left(\frac{a_s - w_b}{2}, \frac{a_s + h_b}{2}\right)\right\} \quad (6)$$

The coordinates of the vertices of the second image Squ in the planar coordinate system are:

$$V_{Square} = \{(0,0), (a_s,0), (a_s,a_s), (0,a_s)\} \quad (7)$$

Letting the size of the template image $I^0$ is $w_{I^0} \times h_{I^0}$, the coordinates of the vertices of the template image $I^0$ are:

$$V_{I^0} = \{(0,0), (w_{I^0},0), (w_{I^0},h_{I^0}), (0,h_{I^0})\} \quad (8)$$

Figure 4:
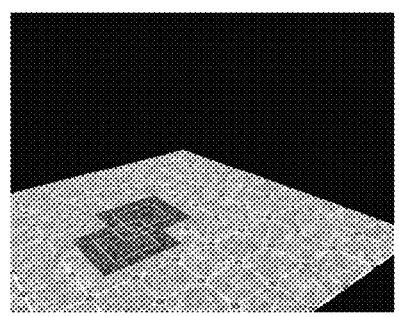
FIG. 4 is a schematic diagram of a transformed image according to one embodiment of the present disclosure.

The first transformation submatrix $T_1$ for mapping the coordinates of the vertices $V_{I^0}$ of the template image $I^0$ to the coordinates of the vertices $V_{square}$ of the second image Squ and a second transformation submatrix $T_2$ for mapping the coordinates of the vertices $V_{Box}$ of the first image Box to the coordinates of the vertices $V_{Reg}$ of the minimum bounding rectangle Reg are determined. The template image $I^0$ is mapped into the coordinate system of the scene image $I^1$ according to the transformation matrix $T_2T_1$ to generate a transformed image $I^3$, as shown in FIG. 4.

In some embodiments, in order to replace the object in the scene image $I^1$ with the transformed image $I^3$, the object mask image M corresponding to the scene image $I^1$ shown in FIG. 5A is marked as shown in FIG. 5B.

Next, the object in the scene image $I^1$ is replaced with the transformed image $I^3$ by using equation (9) to generate a virtual image $I^2$.

$$I_{i,j}^2 = \begin{cases} I_{i,j}^1, & M_{i,j} = 0 \\ I_{i,j}^3, & M_{i,j} > 0 \end{cases} \quad (9)$$

wherein $M_{i,j}$ denotes the pixel value of the pixel point of the $i^{th}$ row, the $j^{th}$ column in the mask image M. If $M_{i,j} > 0$, it shows that the pixel point of the $i^{th}$ row, $j^{th}$ column in the scene image $I^1$ belongs to the area where the object is located, and in this case, the pixel value of the pixel point of the $i^{th}$ row, the $j^{th}$ column in the transformed image $I^3$ is used to replace the pixel value of the pixel point of the $i^{th}$ row, the $j^{th}$ column in the scene image $I^1$. If M=0, it shows that the pixel point in the $i^{th}$ row, the $j^{th}$ column of the scene image $I^1$ does not belong to the area where the object is located, and in this case, the pixel value of the pixel point in the $i^{th}$ row, the $j^{th}$ column of the scene image $I^1$ is not adjusted. Therefore the object in the scene image $I^1$ is replaced with the transformed image $I^3$, as shown in FIG. 6.

In step 102, the scene image is divided into a plurality of image blocks with a preset size.

For example, the scene image $I^1$ is divided into h×w image blocks, each of which has a size of b×b. Let the size of scene image $I^1$ be H×W, then h and w satisfy:

$$h = \text{ceil}\left(\frac{H}{b}\right) \quad (10)$$

$$w = \text{ceil}\left(\frac{W}{b}\right) \quad (11)$$

wherein ceil is a ceiling function.

In step 103, pixel residuals of the scene image is determined according to an average pixel value of pixel points in an area where the object is located in the scene image and an average pixel value of pixel points falling into the area where the object is located in each of the plurality of image blocks.

In some embodiments, the average pixel value of the pixel points in the area where the object is located in the scene image is taken as a reference average value, the average pixel value of the pixel points falling into the area of the object in each of the plurality of image blocks is taken as an average pixel value of the each of the plurality of image blocks, and the pixel residuals of the scene image is determined according to the average pixel value of the each of the plurality of image blocks and the reference average value.

For example, the pixel value of the red channel of the pixel point of the $i^{th}$ row, the $j^{th}$ column in the scene image $I^1$ is $R_{i,j}^1$, the pixel value of the green channel of the pixel point of the $i^{th}$ row, the $j^{th}$ column in the scene image $I^1$ is $G_{i,j}^1$, and the pixel value of the blue channel of the pixel point of the $i^{th}$ row, the $j^{th}$ column in the scene image $I^1$ is $B_{i,j}^1$. The average pixel value u of the pixel points in the area where the object is located in the scene image $I^1$ is:

$$u = \frac{\sum_{M_{i,j}>0}(R_{i,j}^1 + G_{i,j}^1 + B_{i,j}^1)}{3 \times \text{count}(M_{i,j} > 0)} \quad (12)$$

wherein count($M_{i,j}$>0) represents the number of pixels having pixel values greater than 0 in the mask image M, that is, the number of pixels of the area where the object is located in the scene image $I^1$.

For each image block in scene image $I^1$, the average pixel value of the pixel points falling in the area where the object is located is $u_{s,t}$ according to the above equation (12), 0≤s<h, 0≤t<w.

The value $D_{s,t}^1$ in the row s, the column t of the pixel residual $D^1 \in R^{h \times w}$ is:

$$D_{s,t}^1 = u_{s,t} - u \quad (13)$$

It should be noted that, the area where the value is larger than 0 in the pixel residual $D^1$ is an illumination area, and the illumination is stronger when the value is larger. The area where the value is less than 0 in the pixel residual $D^1$ is a shaded area, and the shading is more obvious when the value is smaller.

In step 104, an illumination offsets is determined according to the pixel residuals.

In some embodiments, interpolation processing is performed on the pixel residuals to obtain the illumination offsets, wherein a size of a visual image corresponding to the illumination offsets is the same as a size of the virtual image.

In order to fuse a pixel residual $D^1$ into the virtual image $I^2$, interpolation processing is performed on the $D^1$ to obtain the illumination offsets $D \in R^{H \times W}$, wherein the size of the visual image corresponding to the illumination offsets D is the same as the size of the virtual image.

For example, FIG. 7A is a scene image $I^1$, FIG. 7B is a visual image of the part of the illumination offsets D in which the value is greater than 0, and FIG. 7C is a visual image of the part of the illumination offsets D in which the value is less than 0. FIG. 7B clearly shows the illuminated area, and FIG. 7C clearly shows the shaded area which is shaded by the chairs.

In step 105, the pixel values of the pixel points in the virtual image are updated according to the illumination offsets to realize illumination transfer.

In some embodiments, the pixel values of the pixel points in the virtual image are updated according to the illumination offsets comprises: a first product of an offset $D_{i,j}$ corresponding to a pixel point $P_{i,j}$ at an $i^{th}$ row, a $j^{th}$ column of the virtual image in the illumination offsets and an illumination transfer adjusting parameter σ is calculated. A first sum of a pixel value $R_{i,j}^2$ of a red channel of the pixel point $P_{i,j}$ and the first product is calculated, a second sum of a pixel value $G_{i,j}^2$ of a green channel of the pixel point $P_{i,j}$ and the first product is calculated, and a third sum of a pixel value $B_{i,j}^2$ of a blue channel of the pixel point $P_{i,j}$ and the first product is calculated. A maximum value of a second parameter and a minimum value of the first sum and a first parameter is taken as a pixel value $R_{i,j}^3$ of a red channel of a pixel point at an $i^{th}$ row, a $j^{th}$ column in a first transformed image, a maximum value of the second parameter and a minimum value of the second sum and the first parameter is taken as a pixel value $G_{i,j}^3$ of a green channel of the pixel point at the $i^{th}$ row, the $j^{th}$ column in the first transformed image, and a maximum value of the second parameter and a minimum value of the third sum and the first parameter is taken as a pixel value $B_{i,j}^3$ of a blue channel of the pixel point at the $i^{th}$ row, the $j^{th}$ column in the first transformed image.

For example, the first parameter is 255 and the second parameter is 0.

In some embodiments, the pixel value of each pixel point in the virtual image is updated using the following equations to generate the first transformed image.

$$R_{i,j}^3 = \max(0, \min(R_{i,j}^2 + \sigma D_{i,j}, 255)) \quad (14)$$

$$G_{i,j}^3 = \max(0, \min(G_{i,j}^2 + \sigma D_{i,j}, 255)) \quad (15)$$

$$B_{i,j}^3 = \max(0, \min(B_{i,j}^2 + \sigma D_{i,j}, 255)) \quad (16)$$

The pixel value of the red channel of the pixel point $P_{i,j}$ in the ith row, the jth column in the virtual image I2 is $R_{i,j}^2$, the pixel value of the green channel of the pixel point $P_{i,j}$ in the ith row, the jth column in the virtual image I2 is $G_{i,j}^2$, and the pixel value of the blue channel of the pixel point $P_{i,j}$ in the ith row, the jth column in the virtual image I2 is $B_{i,j}^2$. The offset corresponding to the pixel point $P_{i,j}$ in the illumination offsets is $D_{i,j}$. The pixel value of the red channel of the pixel point in the ith row, the jth column in the first transformed image is $R_{i,j}^3$, the pixel value of the green channel of the pixel point in the ith row, the jth column in the first transformed image are $G_{i,j}^3$, and the pixel value of the blue channel of the pixel point in the ith row, the jth column in the first transformed image is $B_{i,j}^3$. The σ is an illumination transfer adjustment parameter, for example, σ=0.7. The Max is a function for taking the maximum value, and the min is a function for taking the minimum value.

In some embodiments, the generated image can be made more natural by adjusting the saturation of the first transformed image according to the illumination offsets.

After the pixel values of the pixel points in the virtual image are updated according to the illumination offsets to generate the first transformed image, a saturation of a first transformed image is adjusted according to the illumination offsets to generate a second transformed image.

In some embodiments, a saturation of a first transformed image is adjusted according to the illumination offsets comprises: firstly, the normalization processing is performed on the illumination offsets. Then a second product of an offset $D_{i,j}^n$ corresponding to a pixel point $P_{i,j}$ at an $i^{th}$ row, a $j^{th}$ column in the first transformed image in a normalized illumination offsets and a saturation adjusting parameter α is calculated, and a difference between a third parameter and the second product is calculated. Finally a maximum value of a fourth parameter and a third product of a pixel value $S_{i,j}^3$ of the saturation channel of the pixel point $P_{i,j}$ in an $i^{th}$ row, a $j^{th}$ column in the first transformed image and the difference is taken as a pixel value $S_{i,j}^{3'}$ of a saturation channel of a pixel point at an $i^{th}$ row, a $j^{th}$ column in the second transformed image.

For example, the third parameter is 1 and the fourth parameter is 0.

For example, after the illumination offset D is normalized to obtain $D^n$, the pixel value of each pixel point in the first transformed image is updated by using the following equation to generate a second transformed image.

$$S_{i,j}^{3'} = \max(0, S_{i,j}^3 * (1 - \alpha D_{i,j}^n)) \quad (17)$$

The pixel value of the saturation channel of the pixel point $P_{i,j}$ of the $i^{th}$ row, the $j^{th}$ column in the first transformed image is $S_{i,j}^3$, the offset corresponding to the pixel point $P_{i,j}$ in the normalized illumination offsets $D^n$ is $D_{i,j}^n$, and the pixel value of the saturation channel of the pixel point of the $i^{th}$ row, the $j^{th}$ column in the second transformed image is $S_{i,j}^{3'}$, wherein α is a saturation adjusting parameter, for example, α=0.5.

Next, pixel values of a hue channel, a saturation channel and a value channel in the HSV (hue, saturation and value) color space of the second transformed image are transformed into a RGB (red, green and blue) color space.

For example, FIG. 8A is a scene image $I^1$, FIG. 8B is a generated virtual image $I^2$, and FIG. 8C is an image which has undergone illumination transfer and saturation adjustment. The image presented in FIG. 8C is more natural than the image presented in FIG. 8B.

FIG. 9 is a schematic structural diagram of an image processing apparatus according to one embodiment of the present disclosure. As shown in FIG. 9, the image processing apparatus includes a first processing module 901, a second processing module 902, a third processing module 903, and an illumination transferring module 904.

The first processing module 901 is configured to replace an object in a scene image with a preset template image to generate a virtual image.

In some embodiments, the template image is mapped into a pixel coordinate system of the scene image to generate a transformed image. The object in the scene image is replaced with the transformed image to generate a virtual image.

For example, as shown in FIG. 2, the object in the scene image is a floor.

First, a minimum bounding rectangle of the object is generated in the scene image $I^1$, as indicated by the white-line box 21 in FIG. 2. For example, by finding four vertices including the floor area in the scene image, a minimum bounding rectangle Reg of the target is formed according to the four vertices.

Then, the minimum bounding rectangle Reg is mapped from the pixel coordinate system of the scene image $I^1$ into a preset planar coordinate system to obtain a first image Box. Since the template image $I^0$ is a square, as shown in FIG. 3, the first image Box is transformed into a square to obtain a second image Squ in order to avoid distortion in when mapping the template image $I^0$ to the scene image $I^1$.

Next, a first transformation submatrix $T_1$ for mapping the template image $I^0$ to the second image Squ is determined, and a second transformation submatrix $T_2$ for mapping the first image Box to the minimum bounding rectangle Reg is determined. A transformation matrix is obtained according to the first transformation submatrix and the second transformation submatrix.

In some embodiments, the transformation matrix is a product of the second transformation submatrix and the first transformation submatrix, i.e., the transformation matrix is $T_2T_1$. The template image $I^0$ is mapped into a pixel coordinate system according to the transformation matrix.

The second processing module 902 is configured to divide the scene image into a plurality of image blocks with a preset size, and determine pixel residuals of the scene image according to an average pixel value of pixel points in an area where the object is located in the scene image and an average pixel value of pixel points falling into the area where the object is located in each of the plurality of image blocks.

In some embodiments, the average pixel value of the pixel points in the area where the object is located in the scene image is taken as a reference average value, the average pixel value of the pixel points falling into the area of the object in each of the plurality of image blocks is taken as an average pixel value of the each of the plurality of image blocks, and the pixel residuals of the scene image is determined according to the average pixel value of the each of the plurality of image blocks and the reference average value.

The third processing module 903 is configured to determine illumination offsets according to the pixel residuals.

In some embodiments, interpolation processing is performed on the pixel residuals to obtain the illumination offsets, wherein a size of a visual image corresponding to the illumination offsets is the same as a size of the virtual image.

The illumination transferring module 904 is configured to update pixel values of pixel points in the virtual image according to the illumination offsets to implement illumination transfer.

In some embodiments, a first transformed image is generated by updating the pixel value of each pixel point in the virtual image according to the above equations (14) to (16).

In some embodiments, in order to make the generated image more natural, a saturation of a first transformed image is adjusted according to the illumination offsets to generate a second transformed image, after the pixel values of the pixel points in the virtual image are updated according to the illumination offsets to generate the first transformed image. For example, the saturation is adjusted by using the above equation (17).

Next, pixel values of a hue channel, a saturation channel and a value channel in the HSV (hue, saturation and value) color space of the second transformed image are transformed into a RGB (red, green and blue) color space, thereby making the generated image more natural.

Figure 10:
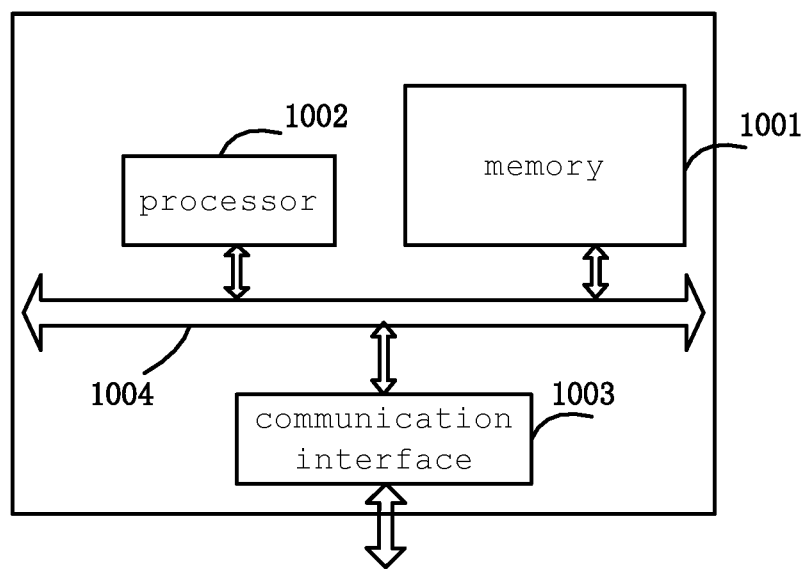
FIG. 10 is a schematic structural diagram of an image processing apparatus according to another embodiment of the present disclosure.

FIG. 10 is a schematic structural diagram of an image processing apparatus according to another embodiment of the present disclosure. As shown in FIG. 10, the image processing apparatus includes a memory 1001 and a processor 1002.

The memory 1001 is used for storing instructions, the processor 1002 is coupled to the memory 1001, and the processor 1002 is configured to execute the method according to any of the embodiments in FIG. 1 based on the instructions stored in the memory.

As shown in FIG. 10, the image processing apparatus further includes a communication interface 1003 for exchanging information with other devices. Meanwhile, the image processing apparatus further includes a bus 1004 through which the processor 1002, the communication interface 1003 and the memory 1001 communicate with each other.

Memory 1001 may include a high-speed RAM memory and may also include a non-volatile memory, such as at least one disk memory. Memory 1001 may also be a memory array. The memory 1001 may also be partitioned into blocks and the blocks may be combined into virtual volumes according to certain rules.

Further, the processor 1002 may be a central processing unit CPU, or may be an application specific integrated circuit ASIC, or one or more integrated circuits configured to implement embodiments of the present disclosure.

The present disclosure also relates to a non-transitory computer-readable storage medium, wherein the computer-readable storage medium stores computer instructions which, when executed by a processor, implement the method according to any one of the embodiments in FIG. 1.

In some embodiments, the functional unit modules described above can be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the present disclosure in the form disclosed. Many modifications and variations will be apparent to practitioners skilled in this art. The embodiment was chosen and described in order to best explain the principles of the present disclosure and the practical application, and to enable others of ordinary skill in the art to understand the present disclosure for various embodiments with various modifications as are suited to the particular use contemplated.

What is claimed is:

1. An image processing method, comprising:
    replacing an object in a scene image with a preset template image to generate a virtual image;
    dividing the scene image into a plurality of image blocks with a preset size;
    determining pixel residuals of the scene image according to an average pixel value of pixel points in an area where the object is located in the scene image and an average pixel value of pixel points falling into the area where the object is located in each of the plurality of image blocks;
    determining illumination offsets according to the pixel residuals; and
    updating pixel values of pixel points in the virtual image according to the illumination offsets to implement illumination transfer.

2. The image processing method according to claim 1, wherein the replacing the object in the scene image with the preset template image comprises:
    mapping the template image into a pixel coordinate system of the scene image to generate a transformed image; and
    replacing the object in the scene image with the transformed image to generate the virtual image.

3. The image processing method according to claim 2, wherein the mapping the template image into the pixel coordinate system of the scene image comprises:
    generating a minimum bounding rectangle of the object in the scene image;
    mapping the minimum bounding rectangle from the pixel coordinate system to a preset plane coordinate system to obtain a first image;
    transforming the first image into a square to obtain a second image;
    determining a first transformation submatrix for mapping the template image to the second image;
    determining a second transformation submatrix for mapping the first image to the minimum bounding rectangle;
    obtaining a transformation matrix according to the first transformation submatrix and the second transformation submatrix; and
    mapping the template image into the pixel coordinate system according to the transformation matrix.

4. The image processing method according to claim 3, wherein
    the transformation matrix is a product of the second transformation submatrix and the first transformation submatrix.

5. The image processing method according to claim 1, wherein the determining the pixel residuals of the scene image comprises:
    taking the average pixel value of the pixel points in the area where the object is located in the scene image as a reference average value;
    taking the average pixel value of the pixel points falling into the area of the object in each of the plurality of image blocks as an average pixel value of the each of the plurality of image blocks; and
    determining the pixel residuals of the scene image according to the average pixel value of the each of the plurality of image blocks and the reference average value.

6. The image processing method according to claim 5, wherein the determining the illumination offsets according to the pixel residuals comprises:
    performing interpolation processing on the pixel residuals to obtain the illumination offsets, wherein a size of a visual image corresponding to the illumination offsets is the same as a size of the virtual image.

7. The image processing method according to claim 1, wherein the updating the pixel values of the pixel points in the virtual image according to the illumination offsets comprises:
    calculating a first product of an offset $D_{i,j}$ corresponding to a pixel point $P_{i,j}$ at an $i^{th}$ row, a $j^{th}$ column of the virtual image in the illumination offsets and an illumination transfer adjusting parameter σ;
    calculating a first sum of a pixel value $R_{i,j}^2$ of a red channel of the pixel point $P_{i,j}$ and the first product, calculating a second sum of a pixel value $G_{i,j}^2$ of a green channel of the pixel point $P_{i,j}$ and the first product, and calculating a third sum of a pixel value $B_{i,j}^2$ of a blue channel of the pixel point $P_{i,j}$ and the first product; and
    taking a maximum value of a second parameter and a minimum value of the first sum and a first parameter as a pixel value $R_{i,j}^3$ of a red channel of a pixel point at an $i^{th}$ row, a $j^{th}$ column in a first transformed image, taking a maximum value of the second parameter and a minimum value of the second sum and the first parameter as a pixel value $G_{i,j}^3$ of a green channel of the pixel point at the $i^{th}$ row, the $j^{th}$ column in the first transformed image, and taking a maximum value of the second parameter and a minimum value of the third sum and the first parameter as a pixel value $B_{i,j}^3$ of a blue channel of the pixel point at the $i^{th}$ row, the $j^{th}$ column in the first transformed image.

8. The image processing method according to claim 1, further comprising:
    adjusting a saturation of a first transformed image according to the illumination offsets to generate a second transformed image after updating the pixel values of the pixel points in the virtual image according to the illumination offsets to generate the first transformed image; and
    transforming pixel values of a hue channel, a saturation channel and a value channel in the hue, saturation and value (HSV) color space of the second transformed image into a red, green and blue (RGB) color space.

9. The image processing method according to claim 8, wherein the adjusting the saturation of the first transformed image according to the illumination offsets comprises:
   performing normalization processing on the illumination offsets;
   calculating a second product of an offset $D_{i,j}''$ corresponding to a pixel point $P_{i,j}$ at an $i^{th}$ row, a $j^{th}$ column in the first transformed image in a normalized illumination offsets and a saturation adjusting parameter α;
   calculating a difference between a third parameter and the second product; and
   taking a maximum value of a fourth parameter and a third product of a pixel value $S_{i,j}^3$ of the saturation channel of the pixel point $P_{i,j}$ in an $i^{th}$ row, a $j^{th}$ column in the first transformed image and the difference as a pixel value $S_{i,j}^{3'}$ of a saturation channel of a pixel point at an $i^{th}$ row, a $j^{th}$ column in the second transformed image.

10. An image processing apparatus, comprising:
   a memory; and
   a processor coupled to the memory, which is configured to execute an image processing method comprising:
      replacing an object in a scene image with a preset template image to generate a virtual image;
      dividing the scene image into a plurality of image blocks with a preset size;
      determining pixel residuals of the scene image according to an average pixel value of pixel points in an area where the object is located in the scene image and an average pixel value of pixel points falling into the area where the object is located in each of the plurality of image blocks;
      determining illumination offsets according to the pixel residuals; and
      updating pixel values of pixel points in the virtual image according to the illumination offsets to implement illumination transfer.

11. The image processing apparatus according to claim 10, wherein the replacing the object in the scene image with the preset template image comprises:
   mapping the template image into a pixel coordinate system of the scene image to generate a transformed image; and
   replacing the object in the scene image with the transformed image to generate the virtual image.

12. The image processing apparatus according to claim 11, wherein the mapping the template image into the pixel coordinate system of the scene image comprises:
   generating a minimum bounding rectangle of the object in the scene image;
   mapping the minimum bounding rectangle from the pixel coordinate system to a preset plane coordinate system to obtain a first image;
   transforming the first image into a square to obtain a second image;
   determining a first transformation submatrix for mapping the template image to the second image;
   determining a second transformation submatrix for mapping the first image to the minimum bounding rectangle;
   obtaining a transformation matrix according to the first transformation submatrix and the second transformation submatrix; and
   mapping the template image into the pixel coordinate system according to the transformation matrix.

13. The image processing apparatus according to claim 12, wherein
   the transformation matrix is a product of the second transformation submatrix and the first transformation submatrix.

14. The image processing apparatus according to claim 10, wherein the determining the pixel residuals of the scene image comprises:
   taking the average pixel value of the pixel points in the area where the object is located in the scene image as a reference average value;
   taking the average pixel value of the pixel points falling into the area of the object in each of the plurality of image blocks as an average pixel value of the each of the plurality of image blocks; and
   determining the pixel residuals of the scene image according to the average pixel value of the each of the plurality of image blocks and the reference average value.

15. The image processing apparatus according to claim 14, wherein the determining the illumination offsets according to the pixel residuals comprises:
   performing interpolation processing on the pixel residuals to obtain the illumination offsets, wherein a size of a visual image corresponding to the illumination offsets is the same as a size of the virtual image.

16. The image processing apparatus according to claim 10, wherein the updating the pixel values of the pixel points in the virtual image according to the illumination offsets comprises:
   calculating a first product of an offset $D_{i,j}$ corresponding to a pixel point $P_{i,j}$ at an $i^{th}$ row, a $j^{th}$ column of the virtual image in the illumination offsets and an illumination transfer adjusting parameter σ;
   calculating a first sum of a pixel value $R_{i,j}^2$ of a red channel of the pixel point $P_{i,j}$ and the first product, calculating a second sum of a pixel value $G_{i,j}^2$ of a green channel of the pixel point $P_{i,j}$ and the first product, and calculating a third sum of a pixel value $B_{i,j}^2$ of a blue channel of the pixel point $P_{i,j}$ and the first product; and
   taking a maximum value of a second parameter and a minimum value of the first sum and a first parameter as a pixel value $R_{i,j}^3$ of a red channel of a pixel point at an $i^{th}$ row, a $j^{th}$ column in a first transformed image, taking a maximum value of the second parameter and a minimum value of the second sum and the first parameter as a pixel value $G_{i,j}^3$ of a green channel of the pixel point at the $i^{th}$ row, the $j^{th}$ column in the first transformed image, and taking a maximum value of the second parameter and a minimum value of the third sum and the first parameter as a pixel value $B_{i,j}^3$ of a blue channel of the pixel point at the $i^{th}$ row, the $j^{th}$ column in the first transformed image.

17. The image processing apparatus according to claim 10, further comprising:
   adjusting a saturation of a first transformed image according to the illumination offsets to generate a second transformed image after updating the pixel values of the pixel points in the virtual image according to the illumination offsets to generate the first transformed image; and
   transforming pixel values of a hue channel, a saturation channel and a value channel in the hue, saturation and value (HSV) color space of the second transformed image into a red, green and blue (RGB) color space.

18. The image processing apparatus according to claim 17, wherein the adjusting the saturation of the first transformed image according to the illumination offsets comprises:

performing normalization processing on the illumination offsets;

calculating a second product of an offset $D_{i,j}''$ corresponding to a pixel point $P_{i,j}$ at an $i^{th}$ row, a $j^{th}$ column in the first transformed image in a normalized illumination offsets and a saturation adjusting parameter $\alpha$;

calculating a difference between a third parameter and the second product; and taking a maximum value of a fourth parameter and a third product of a pixel value $S_{i,j}^{3}$ of the saturation channel of the pixel point $P_{i,j}$ in an $i^{th}$ row, a $j^{th}$ column in the first transformed image and the difference as a pixel value $S_{i,j}^{3'}$ of a saturation channel of a pixel point at an $i^{th}$ row, a $j^{th}$ column in the second transformed image.

19. A non-transitory computer-readable storage medium that stores computer instructions which, when executed by a processor, implement a method comprising:

replacing an object in a scene image with a preset template image to generate a virtual image;

dividing the scene image into a plurality of image blocks with a preset size;

determining pixel residuals of the scene image according to an average pixel value of pixel points in an area where the object is located in the scene image and an average pixel value of pixel points falling into the area where the object is located in each of the plurality of image blocks;

determining illumination offsets according to the pixel residuals; and updating pixel values of pixel points in the virtual image according to the illumination offsets to implement illumination transfer.

* * * * *